United States Patent [19]

Thomsen

[11] Patent Number: 4,611,788
[45] Date of Patent: Sep. 16, 1986

[54] COMBINATION SEAT AND SEAL DEVICE

[75] Inventor: Jack W. Thomsen, LaGrange, Ill.

[73] Assignee: Bruce J. Oliver, Las Vegas, Nev.

[21] Appl. No.: 714,567

[22] Filed: Mar. 21, 1985

Related U.S. Application Data

[62] Division of Ser. No. 504,670, Jun. 15, 1983, Pat. No. 4,516,753.

[51] Int. Cl.4 ............................................. F16K 31/00
[52] U.S. Cl. .................................... 251/363; 251/362; 251/364
[58] Field of Search ............................... 251/360-363, 251/364

[56] References Cited

U.S. PATENT DOCUMENTS

| 2,653,792 | 9/1953 | Sacchini | 251/361 |
| 2,673,062 | 3/1954 | Cornelius | 251/361 |
| 3,346,008 | 10/1967 | Scaromucci | 251/363 |
| 3,598,145 | 8/1971 | Wolfson | 251/360 |

FOREIGN PATENT DOCUMENTS 265932 12/1949 Switzerland ...................... 251/362

Primary Examiner—A. Michael Chambers
Attorney, Agent, or Firm—Frank R. Thienpont

[57] ABSTRACT

An improved integral combination seat and seal device which serves the dual function of providing a seat for a valve member and a circumferentially extending seal to prevent fluid leakage.

13 Claims, 17 Drawing Figures

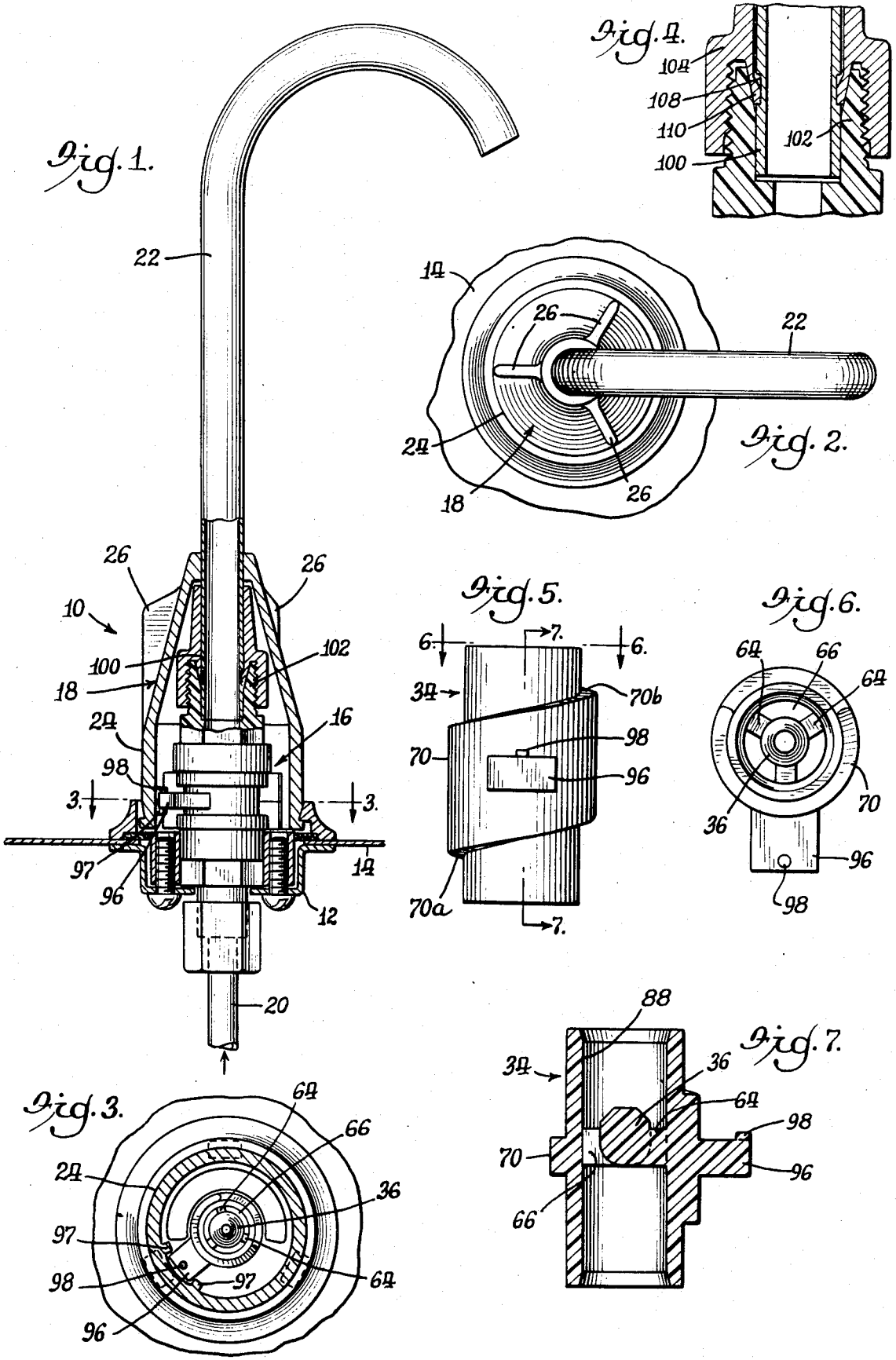

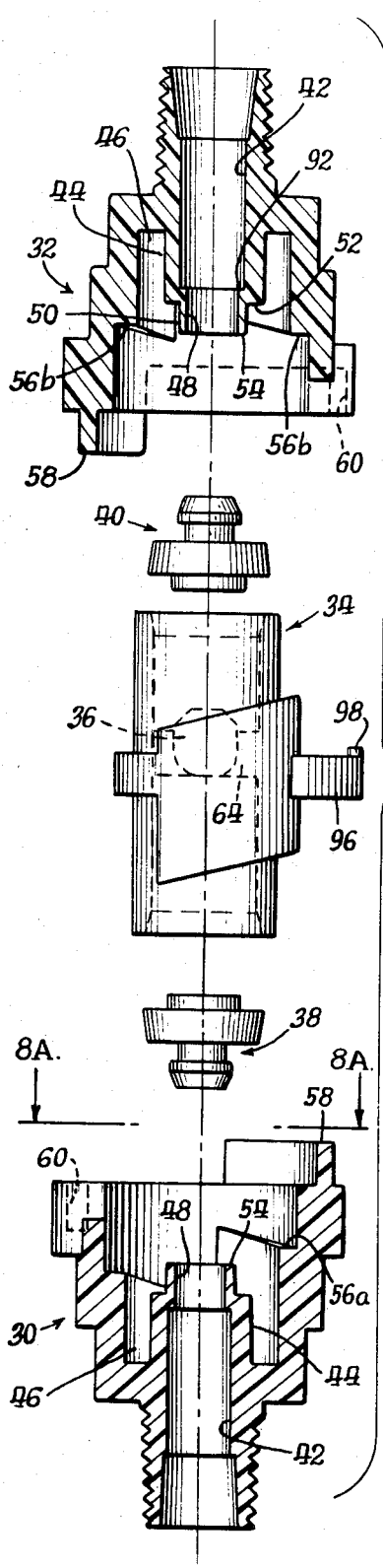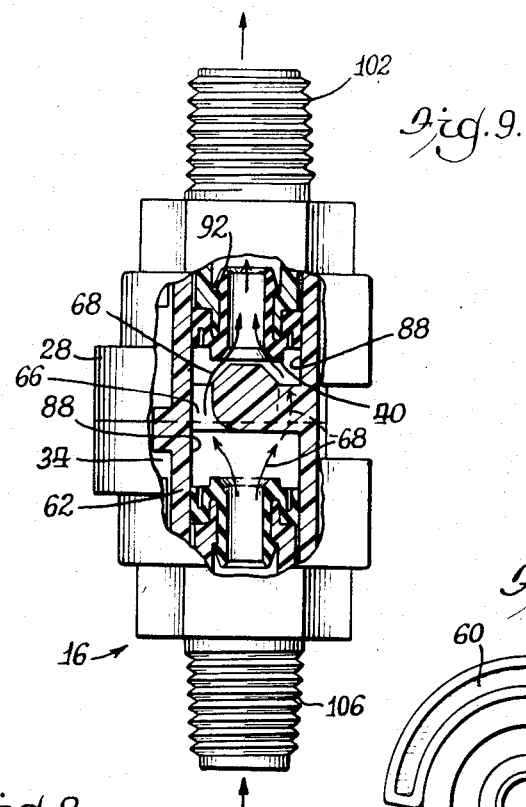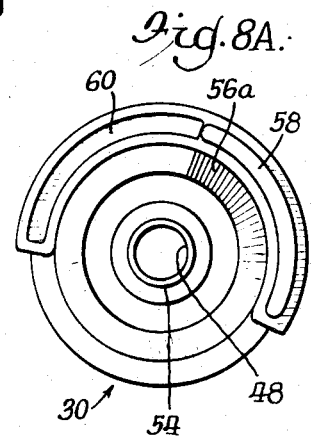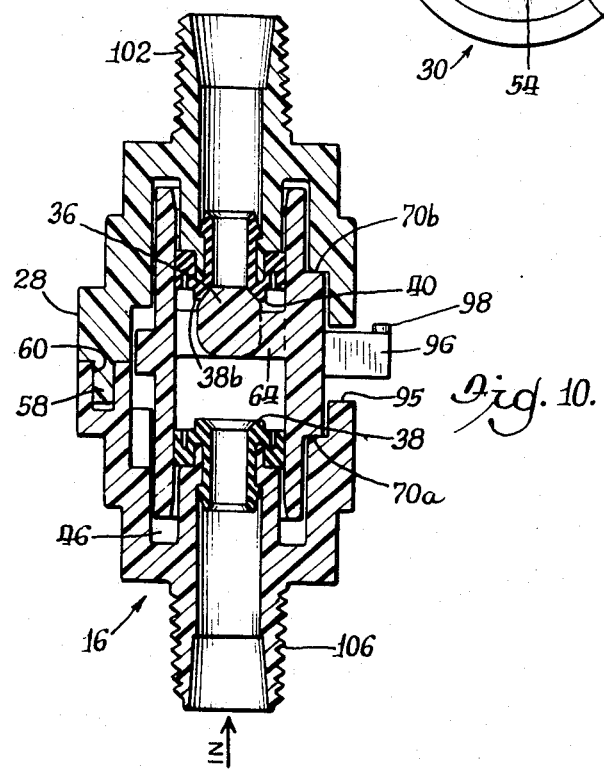

COMBINATION SEAT AND SEAL DEVICE

BACKGROUND OF THE INVENTION

This is a divisional application of Ser. No. 504,670 entitled Faucet Device with Replaceable Valve Cartridge filed June 15, 1983, now U.S. Pat. No. 4,516,753, issued May 14, 1985.

The invention herein relates to a new improved faucet and more particularly to an improved valve mechanism which forms an important part of that faucet.

In many present type faucets the fluid flow path is restricted to a greater or lesser degree. Numerous and costly parts must be machined making for high costs. The parts of most of these valves cannot be molded easily from plastic to reduce the costs. In a bar type faucet the mechanical leverage required to operate the faucet presents some difficulty especially for persons with impairments such as arthritis, and for children. In many of these units full line pressure constantly acts against the spring loaded shut-off at the valve seat, which then becomes a very vulnerable and trouble prone part of the valve design, and numerous seals are required to prevent leakage.

Accordingly, it has become appropriate to develop a new improved faucet device which incorporates an improved valve arrangement. The improved valve arrangement also would be suited for other applications.

SUMMARY OF THE INVENTION

An object of this invention is to provide an improved faucet device incorporating an in-line valve unit which is inexpensive, easily replaceable, and has a minimum number of moving parts.

Another object is to provide in a faucet device an integral valve cartridge including a valve body, sleeve valve member and combination seat and seal members, said valve cartridge being replaceable as a unit to effect easy and quick repair of the faucet.

An object of this invention is to provide an improved faucet device utilizing a valve cartridge wherein no metal parts are in contact with the fluid passing therethrough.

Another object of this invention is to provide an in-line valve which may be easily manufactured in that the valve body comprises a pair of substantially identical molded parts which are fitted together to form the valve body, a tubular valve element carrying a plug valve assembled into the valve body, and combination valve seat and seal means assembled onto the valve body.

Another object is to provide an in-line valve into which a combination valve seat and seal are assembled into each of said two halves—along with a tubular valve member.

A still further object of the invention is to provide in an in-line valve body a combination valve seat and seal means securely inserted in the valve body which is effective to eliminate the necessity of O-ring seals.

Another object is to provide in an in-line valve a combination valve seat and seal means which is effective both to seal against leakage and to provide a valve seat for a plug valve member disposed within the valve.

Another object is to provide an in-line valve body made up of two substantially identical molded halves which are assembled end to end to provide a complete body.

Another object is to provide an in-line valve device which has no metal parts and accordingly is especially well adapted to handle corrosive liquids.

Another object of this invention is to provide a combination seat and seal device which is constructed as an integral one-piece unit.

Another object is to provide an inexpensive valve including a pair of substantially identical valve body parts assembled to provide an in-line valve body and a plug valve carried by a tubular valve member slidably mounted in the valve body.

Other objects and advantageous features of the invention will become more apparent when considering the below description and accompanying drawings.

BRIEF DESCRIPTION OF THE DRAWINGS

FIG. 1 is an elevation view partly in section illustrating a faucet assembly embodying the invention herein;

FIG. 2 is a plan view of the faucet of FIG. 1;

FIG. 3 is a plan view in section taken along line 3—3 of FIG. 1;

FIG. 4 is an enlarged partial sectional view in elevation showing the connection of fluid discharge pipe to the faucet valve outlet as shown in FIG. 1;

FIG. 5 is a view in elevation of a sleeve valve member used in the faucet valve device;

FIG. 6. is a plan view of the sleeve valve member of FIG. 5 taken along line 6—6 of FIG. 5;

FIG. 7 is a sectional view in elevation of the sleeve valve member taken along line 7—7 of FIG. 5;

FIG. 8 is an exploded view of the in-line valve assembly shown in the faucet assembly of FIG. 1;

FIG. 8A is a right end view in elevation of the left-hand valve body part of FIG. 8;

FIG. 9 is a view in elevation and partially in section of the in-line valve assembly of FIG. 8 showing the valve in an open position;

FIG. 10 is a view in elevation and partially in section of the in-line valve assembly of FIG. 8 showing the valve in a closed position;

BRIEF DESCRIPTION OF PREFERRED EMBODIMENTS

Figure 11:
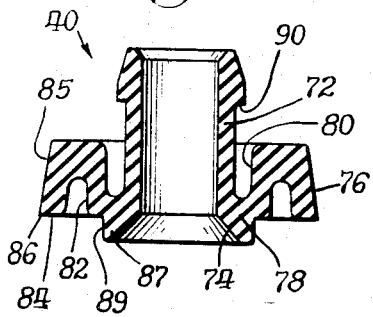
FIG. 11 is an elevation view in section of a combination valve seat and seal structure embodied in the valve assembly of FIG. 8.

FIG. 1 illustrates an improved faucet mechanism 10 embodying the invention. A suitable mounting means 12 may be provided for securing the faucet mechanism 10 to a support such as a sink panel 14. The faucet mechanism 10 includes an in-line valve cartridge unit or assembly 16 and an operating handle 18 for operating the valve unit 16. A fluid inlet pipe 20 is connected to the lower end of the valve unit 16 and a discharge pipe 22 is connected to the upper end of the valve unit. The elongated rotatable operating handle 18 surrounds the valve unit and is operatively connected thereto for opening and closing the valve as later described herein. The operating handle 18 may be constructed in a number of different ways for effecting operation thereof. One such means as here shown is that the handle is constructed with a plurality of vertically extending ribs 26 for grasping the handle to effect a rotational operation thereof.

The in-line valve cartridge unit 16 comprises an elongated valve body 28 which includes two identical generally annular shaped valve body parts 30 and 32. Preferably valve body parts 30 and 32 are made of a plastic material and are made by the plastic molding process. When the plastic molded parts 30 and 32 are assembled they are sealed together. The in-line valve unit 16 also comprises a sleeve valve member 34 disposed within said valve body for axial movement therein, a plug valve 36 carried by the sleeve valve member 34, and a pair of identical combination valve seat and seal members 38 and 40 disposed with in the valve body 28.

The valve body parts 30 and 32 are substantially identical and accordingly only one will be described. Each of the valve body parts 30 and 32 is a substantially annular structure formed with a central bore 42 therethrough to provide either an inlet or outlet, depending on its final position in an assembly as part of the in-line valve unit 16. Internally the part 32 is formed with a central boss 44 which defines in part an annular channel 46 surrounding the boss 44 and which in the valve body assembly provides a support for the tubular sleeve valve member 34. The boss 44 is formed with a central bore 48 which as here shown is an extension of bore 42 which defines an outlet from the valve body. The end of boss 44 is formed with an annular cut-away portion 50 to define a shoulder 52 and a relatively thin annular axially extending portion 54 to provide a support for the combination valve seat and seal unit 40. The shoulder 52 also supports the rim portion of the combination valve seat and seal unit.

An annularly extending face cam in the form of spiral cam surfaces 56a and 56b is formed in each of the molded valve body parts 30 and 32 respectively to coact with a spiral cam flange formed on the outer periphery of the sleeve valve member 34 whereby interaction of the spiral cam flange and the face cam is effective to provide axial movement of the sleeve valve member 34 as the latter is rotated to open and close the in-line valve unit 16.

An arcuately extending boss 58 and an arcuately extending groove 60 are formed at the larger end of each of the molded valve body parts 30 and 32. In the assembled valve body the boss 58 and groove 60 of the molded part 30 mate with groove 60 and boss 58 of molded part 32 respectively in a tongue and groove relationship. Once molded parts 30 and 32 are so fitted they are permanently sealed together preferably by a sonic welding process.

The sleeve valve member 34 comprises an elongated tubular body 62. In the valve unit 16 assembly the ends of the tubular body 62 are supported for axial movement in the annular channels 46 of the molded parts 30 and 32 as best shown in FIG. 10. The sleeve valve 34 includes the plug valve member 36 which is positioned within the tubular body 62 approximately intermediate the ends of thereof. It is mounted within the tubular body 62 at the center of a spider or spoke arrangement 64 to provide openings 66 around the plug valve member 36 so that in operation fluid may pass around it as indicated by the arrows 68 in FIG. 9.

A raised spiral flange 70 is formed on the outer surface of the sleeve valve member 34 so that in the assembled valve the spiral faces 70a and 70b of the spiral flange 70 ride on the spiral face cam 56 formed in the molded parts 30 and 32. Thus when the sleeve valve member is rotated about its axis the interacting spiral flange 70 and face cam 56 effect axial movement of the sleeve valve member 34 and is effective to seat or unseat the plug valve 36 on the valve seat on the combination valve seat and seal member 40.

The combination valve seat and seal members 38 and 40 are identical and may be made of molded rubber or other resilient elastomeric material normally used as a seal. In the valve assembly the valve seat and seal member 40 is attached to boss 44 of molded part 32. A preferred embodiment of a combination valve seat and seal member 40 is shown is detail in FIG. 11. It comprises an elongated tubular portion 72 having a valve seat 74 formed at one end and an annular rim seal portion 76 formed at the same end thereof, i.e., at the same end as the valve seat. The rim seal portion 76, which may be of substantilly square cross-section, is attached to and formed integrally with the tubular portion 72 by the connecting portion 78 to define a cumferentially extending channel or groove 80 so that in the valve assembly the member 40 fits over the annular end 54 of boss 44 as clearly seen in FIGS. 9 and 10. In the embodiment of FIG. 11 another circumferentially extending groove 82 is formed in the rim portion 76 opening in a direction opposite to groove 80 so as to define a lip 84, the outer edge 86 of which forms a seal with the inner surface 88 of tubular body 62 in the valve assembly. The outer periphery 85 of the rim seal portion 76 is slightly tapered radially outwardly at its lower end as viewed in FIG. 11 to help provide a better contact by the lip 84 and its edge 86 with the surface of the tubular body 62. The groove 82 helps to give the needed flexibility in the sealing function. A valve seat extension 87 defines a radially outwardly facing shoulder 89. During operation of the faucet device when the valve is closed fluid pressure acting radially inwardly on the shoulder 89 assists in providing better valve sealing.

The opposite end of the combination seat and seal member 40 of FIG. 11 is formed with a circumferentially extending shoulder 90 on the outer surface of the tubular portion 72. In the valve assembly the shoulder 90 engages a shoulder 92 formed on the internal wall of boss 44 to securely retain the combination seat and seal member in position. During the assembly operation the resilient combination valve seat and seal member 40 is inserted into the bore 48, and by snap action the shoulder 90 engages shoulder 92 on the internal wall of boss 44.

Figure 12:
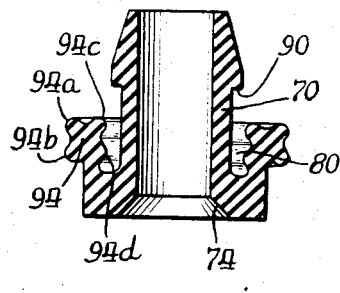
FIG. 12 is an elevation view in section of a modification of the combination valve seat and seal structure of FIG. 11.
Figure 13:
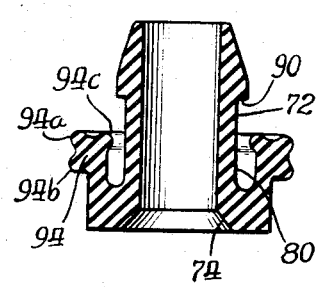
FIG. 13 is an elevation view in section of still another modification of the combination valve seat and seal structure of FIG. 11.

In alternative designs of a combination valve seat and seal member, an annular rim seal portion 94 may be formed with a substantially square cross-section on the corners of which lobes may be formed. FIG. 12 shows such a design wherein lobes are formed on each of the four corners—lobes 94a, 94b, 94c and 94d. In the design of FIG. 13 lobes are formed on three of the corners 94a, 94b and 94c.

In a design having lobes on the annular rim seal portion, lobes preferably are formed on at least the outer two corners as at 94a and 94b as shown in FIGS. 12 and 13. Lobes 94a and 94b will seal against the internal wall of tubular body 62 by diametral squeeze on the rubber by the internal wall of the tubular body 62 and tubular extension 54. Internal fluid pressure within the bore of tubular body 62 also will tend to force the lobe 94b outwardly against the wall of the tubular body 62 to further enhance the sealing effect. Lobe 94a also will seal by virtue of the diametral squeeze thus providing a secondary sealing means.

A third lobe may be formed on another corner as at 94c, and still another fourth lobe may be formed as at 94d.

A radially extending arm 96 is attached to the outside of the sleeve valve member 34 and extends through opening 95 in the valve body for coaction with the operating handle 18. The rotatable operating handle 18 which surrounds the discharge pipe 22 has formed thereon a pair of small lugs 97 to receive the end of arm 96 and coact therewith. Rotation of handle 18 effects rotation of the sleeve valve member 34 causing the spiral cam flange 70 to ride on the spiral face cam 56 to thereby effect axial movement of the valve member 34 to seat and unseat the plug valve 36 in relation to valve seat 74.

An indicator button 98 is formed on arm 96 to indicate the location of and direction of movement of plug valve 36 within valve member 34 to seat the plug valve.

Figure 14:
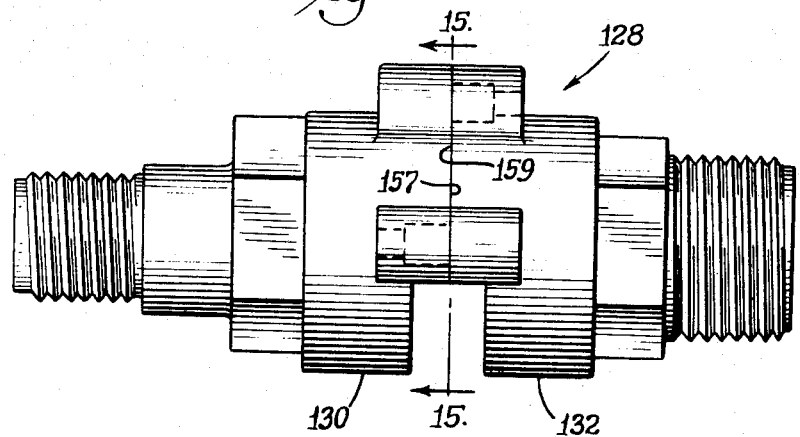
FIG. 14 is a view in elevation of an in-line valve body showing another embodiment of valve body parts which are joined to form a valve body.
Figure 15:
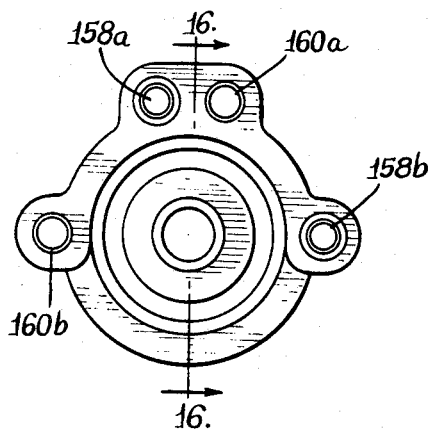
FIG. 15 is a right end view in elevation of the left-hand valve body part of FIG. 14 taken along line 15—15 of FIG. 14.
Figure 16:
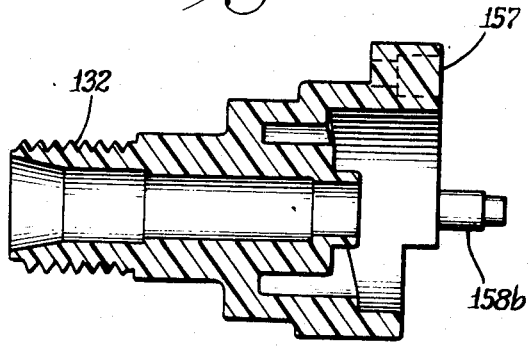
FIG. 16 is a sectional view in elevation of a valve body taken along line 16—16 of FIG. 15.

Another embodiment of a valve body designated as 128 is shown in FIG. 14. It includes two valve body parts 130 and 132. The internal construction of parts 130 and 132 is the same as in parts 30 and 32. A valve embodying the valve body parts 130 and 132 functions and operates in the same manner as valve unit 16. The only difference between parts 30/32 and 130/132 respectively is the manner of joining the two parts at their mid-point to form valve body 128. As shown in FIG. 14 the faces 157 and 159 of parts 130 and 132 each have formed thereon a pair of pins 158a and 158b. A pair of openings 160a and 160b also are formed in the faces 157 and 159. In the assembled valve construction the openings 160a and 160b receive the pins 158a and 158b.

The end 100 of discharge pipe 22 may be attached to outlet end 102 of valve unit 16 by insertion into the end of the valve body 28 as shown in FIGS. 1 and 4. A securing seal cap 104 surrounding the end of discharge pipe 22 sealingly secures the discharge pipe to the valve body. The inlet pipe 20 may be secured to the inlet end 106 of valve unit 16 by a similar arrangement.

The discharge pipe 22 is attached to the outlet by an arrangement to permit swiveling of the discharge pipe. One manner of providing a swivelability feature is to provide in the discharge pipe a groove 108 as shown in FIG. 4. An annular flange 110 attached to the securing seal cap 104 is urged into the groove 108 when the cap 104 is secured to the valve body loosely enough to permit swiveling of the discharge pipe but tightly enough to retain the discharge pipe in place.

Although operation of the valve should be reasonably apparent from the above description and the accompanying drawings, a brief description of the operation will now be made. The handle 18 is rotated to open or close the valve. Rotation of the handle 18 rotates the sleeve valve member 34 through coaction of the lugs 97 on the handle 18 and the arm 96 attached to the outer surface of the sleeve valve member. Rotation of the sleeve valve member 34 effects its axial movement through the coaction of the spiral cam surfaces 70a and 70b with the spiral face cams 56a and 56b respectively formed on the internal wall of the valve body 28. The valve is shown in its open position in FIG. 9 allowing liquid to flow from the inlet 106 into the valve body, through the openings 66 around the plug valve 36 as indicated by arrows 68 and out through the tubular portion of the combination seat and seal member 40 to outlet 102 and discharge pipe 22.

When the valve is closed, it will be observed that fluid pressure acts in the groove 82 of the rim seal portion 76 to urge the lip 84 against the internal wall 88 of the sleeve valve member 34 to enhance the sealing effect.

It will be apparent that I have advantageously designed a new faucet device incorporating an improved in-line valve cartridge unit. The valve unit preferably is made entirely of a molded plastic. Since the valve body consists of two substantially identical molded parts which are joined together end to end and the valve member also is made of a molded plastic, the manufacturing costs are kept to minimum. The combination seat and seal devices which are permanently secured in the valve unit eliminate the need for O-ring seals. Since none of the valve parts are metal, corrosion problems are eliminated. The valve unit can be made inexpensively enough so that if in time it becomes defective, the entire valve cartridge unit is disposed of and replaced.

While certain preferred embodiments of the invention have been disclosed, it will be appreciated that these are shown by way of example only, and the invention is not to be limited thereto as other variations will be apparent to those skilled in the art, and the invention is to be given its fullest possible interpretation within the terms of the following claims.

What is claimed is:

1. An integral combination valve seat and seal device comprising:
   a tubular portion including means defining a seat portion formed at one end of said tubular portion and an outwardly extending shoulder formed intermediate the ends of said tubular portion for retention of said device in a tubular structure;
   an annular rim seal portion connected to said tubular portion at the end adjacent said seat portion;
   sealing means formed on the outer periphery of said annular rim seal portion;
   said sealing means including a generally axially extending sealing surface operable to coact with a surrounding cylindrical surface of a cooperating member.

2. The device of claim 1 wherein
   said annular rim seal portion comprises a substantially square cross-section.

3. The device of claim 1 wherein
   said annular rim seal portion comprises a substantially square cross-section, and
   a portion of said annualar rim seal portion is spaced from said tubular portion to define an annular channel between said rim seal portion and said tubular portion, said annular channel being adapted to receive the end of a tubular structure to thereby support said combination valve seat and seal device on said tubular structure.

4. The device of claim 3 including
   means defining an annular groove in said rim seal portion, said annular groove opening in a direction opposite to that of said annular channel.

5. The device of claim 3 wherein
   the outer periphery of said rim seal portion is tapered radially outwardly to define a larger diameter outer periphery at the end of said rim seal disposed most closely adjacent said seat portion.

6. The device of claim 1 wherein said device is made of a resilient material.

7. The device of claim 1 wherein said device is made of a rubber material.

8. The device of claim 3 wherein said annular rim seal portion includes means defining at least one lobe formed on the outer periphery thereof.

9. The device of claim 3 wherein said annular rim seal portion includes means defining a pair of lobes formed on the corners of the outer periphery thereof.

10. The device of claim 3 wherein said annular rim seal portion comprises a substantially square cross-section with lobes formed on a plurality of the corners therof.

11. The device of claim 3 wherein said annular rim seal portion comprises a substantially square cross-section with lobes formed at three corners thereof.

12. The device of claim 3 wherein said annular rim seal portion comprises a substantially square cross-section with lobes formed at each of the four corners thereof.

13. An integral combination valve seat and seal device comprising:
a tubular portion including means defining a seat portion formed at one end of said tubular portion and an upwardly extending shoulder formed intermediate the ends of said tubular portion for retention of said device in a tubular structure;
an annular rim seal portion connected to said tubular portion at the end adjacent said seat portion;
sealing means formed on the outer periphery of said annular rim seal portion;
said sealing means including a generally axially extending sealing surface constructed and arranged to coact with and maintain sealing engagement with an inner cylindrical surface of a slide valve member with which said combination valve seal and seal device is adapted to be associated.

* * * * *